United States Patent [19]

Marino

[11] Patent Number: 4,512,840

[45] Date of Patent: Apr. 23, 1985

[54] METHOD AND APPARATUS FOR WOOD FLOORING MANUFACTURE

[76] Inventor: Vincent J. Marino, 45 West St., Beverly Farms, Mass. 01915

[21] Appl. No.: 284,077

[22] Filed: Jul. 16, 1981

Related U.S. Application Data

[63] Continuation-in-part of Ser. No. 231,862, Feb. 5, 1981, Pat. No. 4,360,992, which is a continuation of Ser. No. 963,094, Nov. 22, 1978, abandoned.

[51] Int. Cl.[3] .......... B32B 31/12; B32B 31/20

[52] U.S. Cl. .......... 156/304.1; 118/209; 118/220; 118/226; 144/352; 156/304.3; 156/546; 156/558; 156/559; 156/578

[58] Field of Search .......... 156/304.1, 304.3, 558, 156/559, 560, 578, 546, 324; 144/348, 352; 118/209, 216, 220, 226

[56] References Cited

U.S. PATENT DOCUMENTS

| | | | |
|---|---|---|---|
| 1,756,583 | 4/1930 | Cadwallader | 52/403 |
| 1,890,954 | 12/1932 | Snyder | 52/393 |
| 1,913,290 | 6/1933 | Rockwell | 52/403 |
| 2,026,511 | 12/1935 | Storm | 52/443 |
| 2,277,892 | 3/1942 | Swenson | 52/403 |
| 2,516,280 | 7/1950 | Welch | 156/546 |
| 2,642,835 | 6/1953 | Winkel | 156/559 |
| 3,322,593 | 5/1967 | Conti | 156/578 |
| 3,334,557 | 8/1967 | Fitzgibbon | 52/309.5 |
| 3,365,850 | 1/1968 | Marino | 52/309.3 |
| 3,579,941 | 5/1971 | Tibbals | 52/384 |
| 3,629,986 | 12/1971 | Klittich | 52/396 |
| 3,682,751 | 8/1972 | Gebhardt et al. | 156/546 |
| 4,050,206 | 9/1977 | Utsuyama | 52/396 |

FOREIGN PATENT DOCUMENTS 1054127 2/1954 France .

*Primary Examiner*—Michael Wityshyn
*Attorney, Agent, or Firm*—Lahive & Cockfield

[57] ABSTRACT

A machine for assembling wood flooring intermittently advances rows of wood fillets lengthwise along side-by-side paths. Glue is applied to opposed longitudinal sides of the fillets in adjacent rows, and a strip of compressible material is inserted between the glue-bearing fillet surfaces. The rows converge and the fillets are pressed together to join the fillets and the cushion material. The pressing preferably occurs at a station where glue is simultaneously applied to other rows of fillets. Each glue applicator has an outwardly-directed face for applying glue to the fillets as they slide by the face, and the face is apertured with a recess which contains glue supplied from a pressured source.

19 Claims, 14 Drawing Figures

METHOD AND APPARATUS FOR WOOD FLOORING MANUFACTURE

This application is a continuation-in-part of application Serial No. 231,862 for "Improved Dimensionally Stable Wood Flooring" filed Feb. 5, 1981, now U.S. Pat. No. 4,360,992, which is a continuation of now-abandoned application Ser. No. 963,094 filed Nov. 22, 1978.

This invention relates to methods and apparatus for manufacturing wood flooring from fillets of wood or similar material. In particular, it provides a method and apparatus for manufacturing wood flooring with compressible material between the blocks of wood.

BACKGROUND OF THE INVENTION

Wood has long been an attractive and desirable element for flooring. When small blocks of wood are used, they are traditionally pre-assembled into tiles or panel sections for convenience of installation on a sub-floor.

A problem common to wood flooring is that the material tends to expand and contract significantly as a function of temperature and humidity. If enough space is left between adjacent pieces of wood to allow for expansion, the resultant gaps are unsightly and become filled with dirt. If the wood pieces are installed close together, subsequent swelling of the wood is likely to cause buckling and warping of the floor.

U.S. Pat. No. 3,365,850 describes a multiple-fillet wood tile that endeavors to accommodate the dimensional instability of wood. An improved solution to the problem is described in the co-pending above-noted application Ser. No. 231,862. That application discloses a wood flooring in which a foam cushion is interposed between adjacent wood fillets. When the wood fillets expand, the cushion between them is compressed. When the wood fillets shrink, the cushion expands to take up the space between the fillets.

Having established the desirability of having such an arrangement with a cushion between the wood fillets, it becomes desirable to have an inexpensive and efficient method and machine for the manufacture of such wood flooring in sheets or planks that are convenient to install. Accordingly, it is an object of this invention to provide a method and a machine for the manufacture of wood flooring having the elements just described.

SUMMARY OF THE INVENTION

Apparatus according to the invention for assembling flooring from fillets of wood or similar material has means for supporting a first row of fillets advancing side by side with a second row of fillets on assembly paths, first gluing means for gluing the longitudinal edges of fillets in the first row to a first side of a cushion of compressible material, and second gluing means for gluing the longitudinal edges of fillets in the second row to the opposite, second, side of the cushion. The invention also features gluing the cushion to the edges of fillets in the first and second rows concurrently.

The invention also features a first glue station having glue-applying means between at least first and second adjacent paths of fillets for applying glue to opposing edge faces of the fillets in the paths, and a pressing station, located downstream of the glue station, for pressing fillets in the first and second paths transversely to the direction of fillet advance, whereby fillets in the first and second paths are bonded together.

The invention also features a second glue station downstream of the first glue station and having second glue applying means between at least the first path of fillets and a next adjacent outer third path of fillets for applying glue to opposing faces of fillets in the first and third paths, and second pressing means located downstream of the second glue station for pressing together fillets in the first, second and third paths, whereby the fillets in those paths are joined together. The second glue station preferably includes the first pressing station.

Another feature of the invention is guide apparatus for guiding glued fillets along prescribed assembly paths and without contact with the glue-bearing edge faces of the fillets. For this purpose the invention provides idler rollers that bear against the tops of the fillets. Each idler roller rotates about an axis that is skewed relative to the path, to press the fillet along a sliding guide rail.

Each glue station can operate with a cushion-introducer that feeds a thin compressible cushion, preferably a continuous ribbon of compressible and expandable foam material, between the glue-carrying edge faces of the fillets in each pair of adjacent paths. The pressing station urges the two rows of glue-carrying fillets, in each pair of adjacent paths, against opposite sides of the cushion, and thereby adhesively bonds the cushion and the fillets together.

Another feature of the invention is that the glue-applying means forms first and second opposite and outwardly directed faces, for applying glue to opposing edges of fillets in adjacent paths, and defines glue-carrying conduits connectable to a supply of glue for delivering glue to the faces. The glue-applying faces are apertured with elongated recesses that communicate with the glue-carrying conduits. Each glue-applying face is configured, at the trailing edge thereof, with a tapered blade-like recess. This spreading recess enhances the spread of a continuous glue coating having a selected thickness over a prescribed width of a fillet face.

The method of the invention includes advancing first and second rows of fillets side by side on assembly paths, gluing the longitudinal edges of fillets in the first row to a first side of a cushion of compressible material, and gluing the longitudinal edges of fillets in the second row to a second, opposite side of the cushion. The method also features applying glue to opposing edge faces of fillets in adjacent paths, inserting compressible material between the glue-bearing opposing fillet faces, and pressing the fillets in the adjacent paths together with the compressible material between them, whereby the fillets are glued to opposing faces of the compressible material. The method further includes advancing the glue-carrying fillets along prescribed paths without engaging the glue-carrying surfaces.

The invention thus provides a machine and a method for the manufacture of panel-like sections or planks of wood flooring from small blocks or fillets. The fillets are adhesively joined to form the flooring sections or planks which, after any desired surface-finishing operations, are ready to install over a sub-floor.

The flooring includes a compressible and expandable cushion between adjacent rows of the fillets and adhesively joined to them. The cushion enables the flooring to accommodate the significant expansion and contraction which changes in temperature and in humidity cause in wood. The cushion is preferably in the form of a continuous ribbon, which contributes to the longitudinal strength of the flooring sections.

Practice of the invention can produce a wood flooring of high quality and with enhanced resistance to deterioration by expansion and contraction. Moreover, flooring manufactured according to the invention can employ small fillets, which can be obtained from first grade raw materials as well as from low-defect portions of significantly lesser grade raw material.

The manufacturing machine and apparatus are characterized by a progressive build-up of adjacent rows of fillets into preassembled panel sections. The operations for adding a row of fillets to the assemblage include a selected sequence of glue application to opposed edge faces of fillets in adjacent rows, interpositioning the cushion between the glued edges, and pressing the glued fillets against opposite sides of the cushion to adhesively join the fillets and the cushion into a self-supporting assemblage. The machine and method of the invention preferably carry out this series of operations simultaneously on two sides of a central row of fillets.

The apparatus and method for applying the glue, which is a liquid adhesive such as conventional contact cement, to the edge faces of the fillets apply a generally continuous and uniform coating of controlled thickness over essentially the entire edge surface of fillets as they advance along an assembly path. Yet it confines the glue essentially onto to the edge faces, so that minimum cleanup, if any, is required. More particularly, the invention provides a glue applicator having a slide surface along which the edge face of the wood fillet moves. The slide surface is apertured with a slot elongated along the direction of the fillet advance. The slot receives glue from a pressured supply to form a dynamic reservoir of glue that apertures the slide surface and which is in effect contained by the fillet edge face that is to be coated with glue. The slide surface includes, at the trailing end of the slot, a recess of diminishing depth for controlling the thickness and the width of the glue on the fillet.

The glued fillet next engages a top-bearing idler wheel and single-sided guide rail which guide the fillet advance, without engaging the glue-bearing side, further along the assembly path. The idler axis is skewed toward the guide rail to maintain the proper fillet location for further assembly.

The invention accordingly comprises the several steps and the relation of one or more of such steps with respect to each of the others, the apparatus embodying features of construction, combinations and arrangements of parts which are adapted to effect such steps, and the flooring article which possesses the characteristics, properties, and relation of elements, all as exemplified in the detailed disclosure hereinafter set forth, and the claims indicate the scope of the invention.

BRIEF DESCRIPTION OF THE DRAWINGS

Other objects, features and advantages of the invention will be described or will be inherent in the following description of a preferred embodiment of the invention, including the drawings thereof, in which.

DESCRIPTION OF PREFERRED EMBODIMENT

Figures 1, 2:
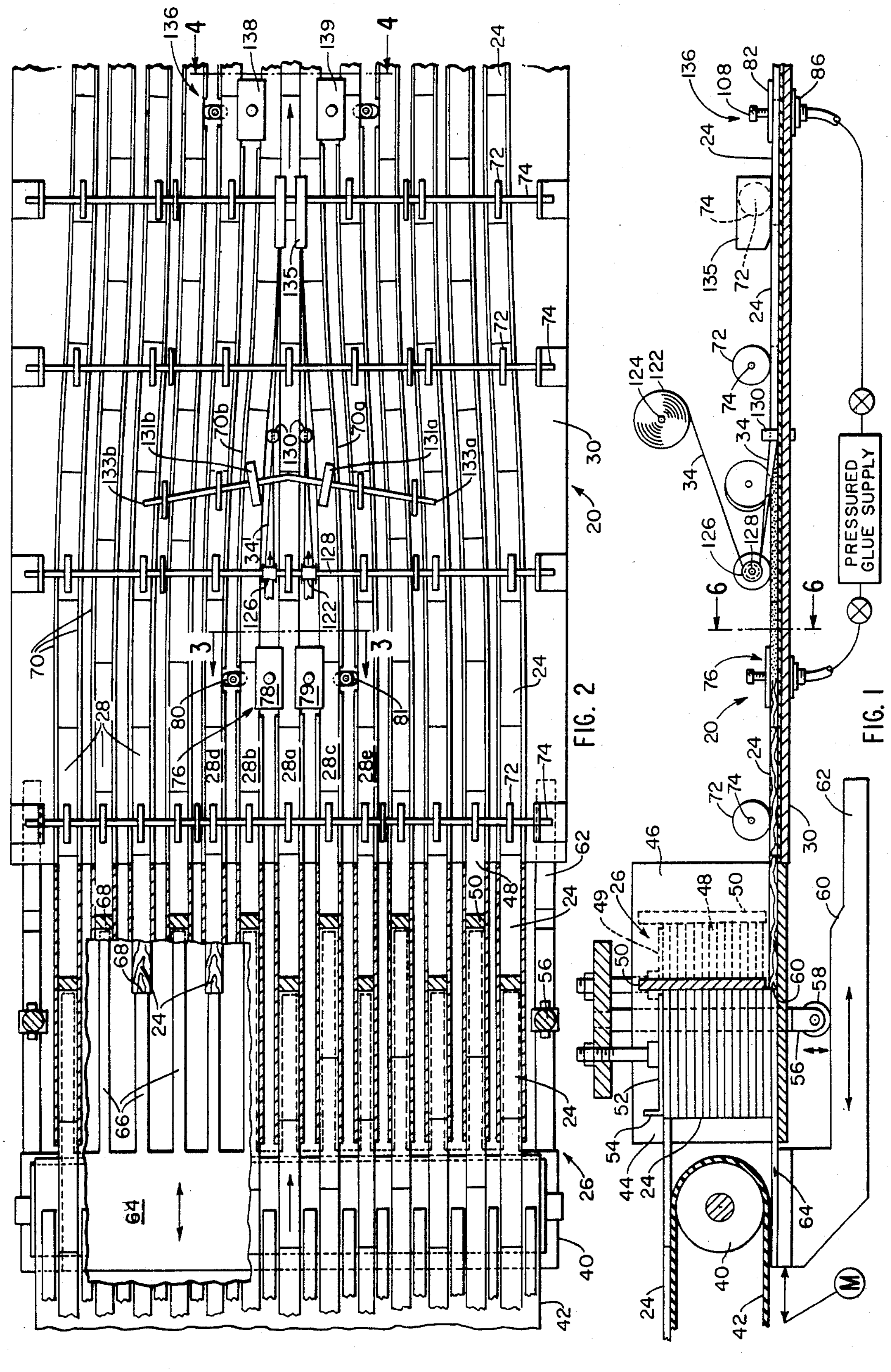
FIG. 1 is a side elevation view of the front portion of a wood flooring machine embodying the invention, showing a feeding station and first and second gluing stations.
FIG. 2 is a top plan view of the machine portion of FIG. 1.
Figure 5:
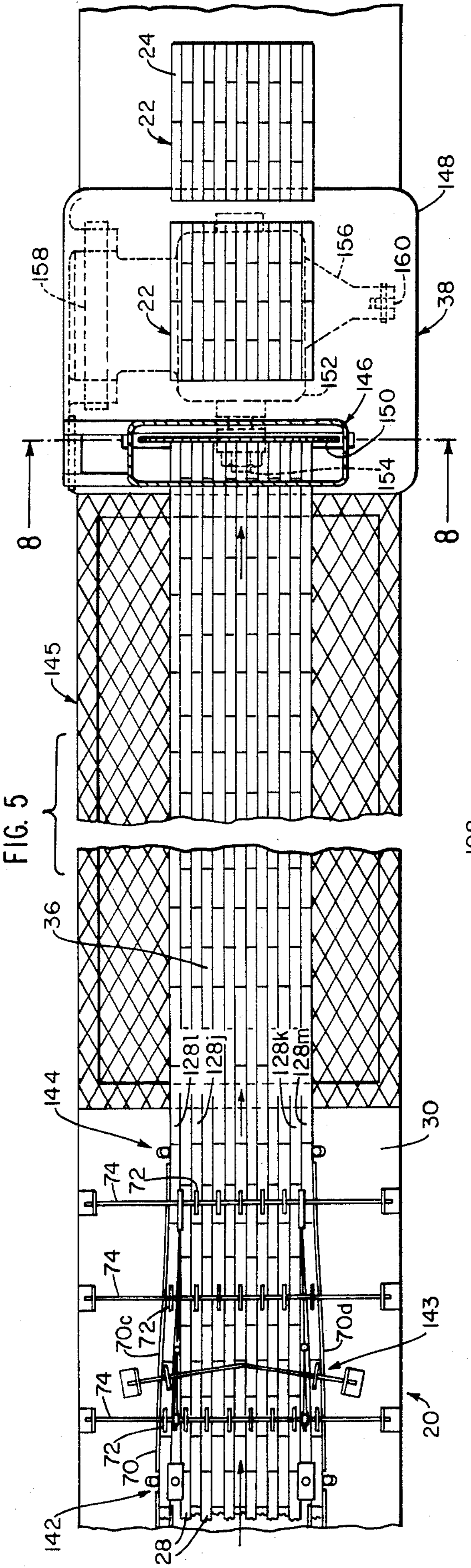
FIG. 5 is a top plan view of the end portion of the machine, showing a final gluing station, a final pressing station, a heating station, and a cutting station.
Figure 14:
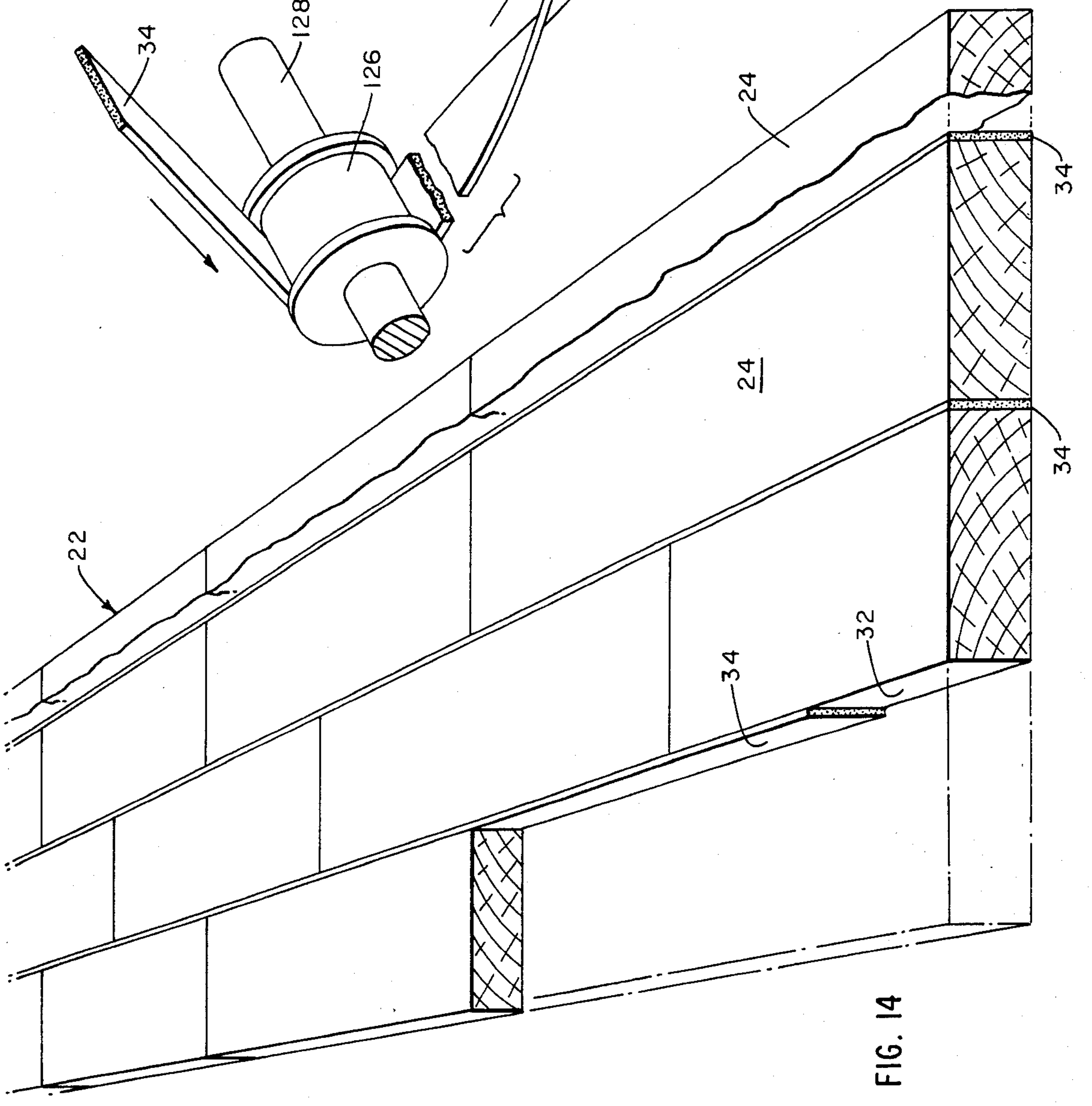
FIG. 14 is a detailed view of a plank of wood flooring produced according to the invention.

FIGS. 1, 2 and 5 show a machine 20 for assembling planks 22 of wood flooring as shown in FIG. 14 from wood fillets 24. The fillets 24 are of uniform size, each typically being about eight-tenths centimeter thick, two and one-quarter centimeters wide, and fourteen centimeters long. The illustrated machine 20 produces assembled planks 22 that are thirteen fillets wide and can be several meters long.

Figure 8:
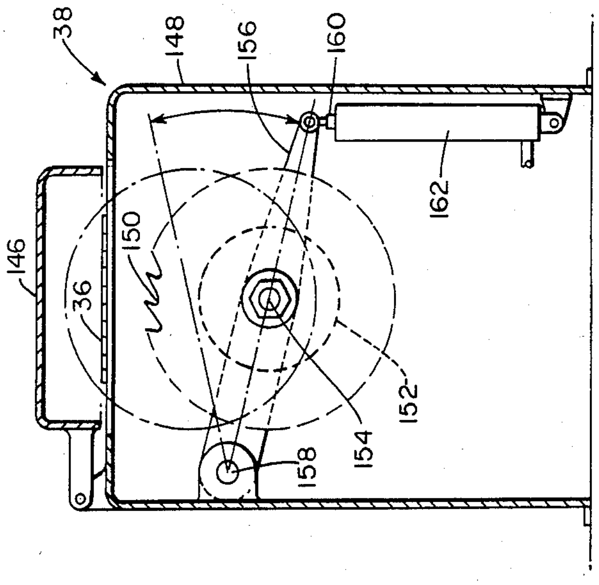
FIG. 8 is an end elevation view of the cutting station of FIG. 5.

The fillets 24 are introduced to the machine 20 at a feed station 26, at the left side of FIGS. 1 and 2, and are intermittently moved in substantially parallel paths 28 on a table 30. The fillets 24 are glued along their long, narrow edges or sides 32 as they move along the paths 28, and are assembled with strips 34 of compressible material between them, so that the sides 32 of the fillets adhere to the compressible cushion strips 34. This forms a continuous sheet 36 of wood flooring having multiple side-by-side rows of wood fillets 24, with compressible strips 34 between each row. The adhesive bond of each fillet to the compressible strips holds the elements of the sheet together. The wood fillets 24 in adjacent rows are displaced from each other by half-lengths in the forward direction, for firmer construction. The continuous sheet 36 is cut at selected intervals at a cutting station 38 at the end of the machine 20 (FIGS. 5 and 8) to form the planks 22.

At the feed station 26 of the illustrated machine (see FIGS. 1 and 2), a rotating conveyor drum 40 moves a conveyor belt 42 which brings wood fillets 24 in thirteen generally parallel rows to the top entrance 44 of a magazine 46. The magazine 46 has thirteen parallel channels 48 in which the fillets 24 are stacked, with adjacent stacks 49 in the channels 48 being displaced by one-half a fillet length. Front walls 50 of the magazine 46 keep the stacked fillets 24 from going forward, and hold-down plates 52 with backwardly facing, upwardly turned lips 54 limit the height of the stacks 49. The magazine front walls 50 are fixed but the hold-down plates 52 are movable vertically, being mounted on a vertically-movable lifter rod 56 which in turn rests on a cam wheel 58. The cam wheel 58 rides on the upper surface 60 of a forwardly and backwardly reciprocating cam 62, to raise and lower the hold-down plates 52 regularly to allow fillets 24 on the conveyor belt 42 to replenish the stacks 49. A reciprocating drive motor M, typically the piston of a hydraulic cylinder, provides the reciprocating motion for the cam 62.

The reciprocating motor M also drives a multi-pronged pushing fork 64, FIGS. 1 and 2, that ejects fillets one at a time from each row of the magazine 46 to the table 30. The forward motion of the fork against the fillets is the sole drive to advance the fillets 24 along the machine table 30. The magazine front walls 50 have openings at their bottom to allow the ejection of fillets 24 from the bottom of the stacks 49. The pushing fork 64 has tines 66 with adjacent front edges 68 displaced by a distance equal to one-half the length of a fillet 24. The reciprocating movement of the fork 64 thereby regularly pushes fillets 24 out of the bottom of the stacks 49, and intermittently pushes the entire collection of fillets 24 together on the machine table 30 through the entire assembly process.

Guide walls 70 extending in the forward direction and rising from the machine table 30 define the paths 28 along which the unassembled fillets 24 first move on the table 30. Upon leaving the feed station 26, for example, thirteen pairs of walls 70 define thirteen side-by-side, parallel paths 28 for fillets 24 traveling lengthwise in the forward direction (from the feed station 26 to the cutting station 38 and left to right in FIGS. 1, 2 and 5), pushed along by the fork 64. Sets of hold-down wheels 72, each set mounted on a common axle 74 mounted on the table 30, engage the top of the fillets 24 as they emerge from the feed station 26, and at spaced intervals thereafter along the machine 20, to maintain the fillets flat on the table 30 and thereby inhibit upward buckling of the pushed-along fillets 24.

With further reference to FIGS. 1 and 2, the assembly of the advancing fillets 24 into a panel of wood flooring takes place progressively, on a row-by-row basis and preferably outwardly from the center row. That is, with further reference to FIGS. 1 and 2, the assembly of the advancing fillets 24 into a panel of wood flooring takes place progressively, on a row-by-row basis and preferably outwardly from the center row. That is, fillets 24 moving in the centermost path 28 are glued first and then those in the next adjacent outer paths are glued, and so on. The assembly process in the preferred embodiment thus begins with the three central paths, viz., the center path **28*a*, and the paths 28*b* and 28*c*** on either side.

Just upstream of the first gluing station 76, the guide walls 70 for the three central paths **28*a*, 28*b* and 28*c* terminate so that they do not interfere with operation of the gluing station. Downstream of the first gluing station 76, only the walls 70 guiding the outside of the fillets 24 in the path 28*b* and 28*c* resume, to guide the fillets 24 in those paths for a distance between the station 76 and the second gluing station 136**.

Further, idler wheels **131*a* and 131*b* engage the tops of the glued fillets and constrain them to slide along the guide rails which the two walls 70*a* and 70*b* form at this stage of the machine. The walls 70*a* and 70*b* moreover converge between the stations 76 and 136 to bring the fillets in the paths 28*b* and 28*c* together with the fillets in the central path 28*a*. As shown in FIG. 2, the idler wheels 131*a* and 131*b* are on block-mounted shafts 133*a* and 133*b*, respectively, which are skewed opposite to, and substantially equal to, the convergence of the walls 70*a* and 70*b*. For example, the wheel 131*a* rotates on a shaft 133*a* which is skewed away from the central path 28*a*, whereas the wall 70*a*** converges inward, toward the central path.

Figure 3:
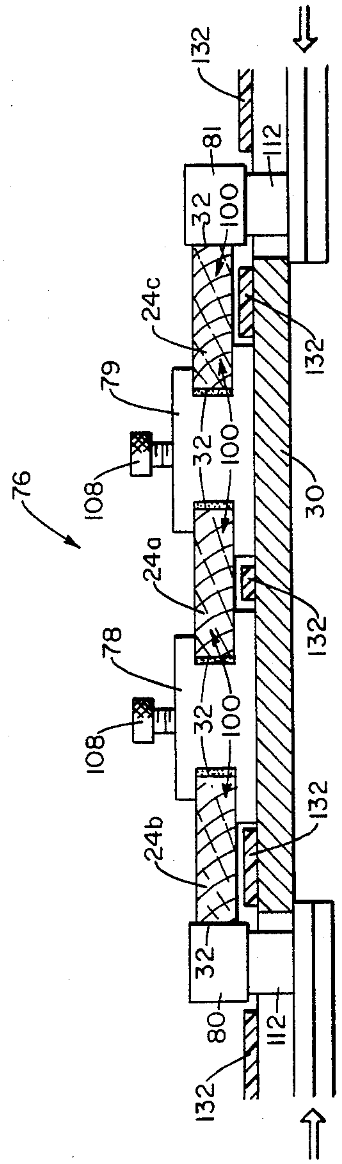
FIG. 3 is a fragmentary transverse sectional view of wood fillets in the first gluing station of the machine, taken along line 3—3 of FIG. 2.

The first gluing station 76 has a pair of glue applicators 78, 79 and the row of fillets **24*a* in the central path 28*a* pass between them, as FIG. 3 shows. Also in the station 76, the fillet 24*b* in one adjacent path 28*b* passes between the other side of the glue applicator 78 and a pressing idler wheel 80. The fillet 24*c* in the other outer path 28*c* passes between the other applicator 79 and another idler wheel 81. The applicators 78, 79 and the pressing idler wheels 80, 81 are aligned with one another along a direction perpendicular to the movement of the fillets 24 down the table 30, as FIG. 2** shows.

Each glue applicator 78, 79 in the first gluing station 76, and in subsequent gluing stations of the machine 20, is alike. As FIGS. 9–12 show, each applicator is formed of solid material such as metal and has a head 82 seated in a table recess 83, suitably formed by placing slide spacers 132 on the table 30 to raise the fillets for alignment with the glue applicators as the paths thereof pass the gluing stations. Each illustrated applicator further has a downwardly-extending externally-threaded mounting stem 84. A glue-carrying conduit 88 carries glue 90 from a pressured exterior glue supply, FIG. 1, to an interior glue passage 92 in the applicator stem 84 and head 82.

Figure 10:
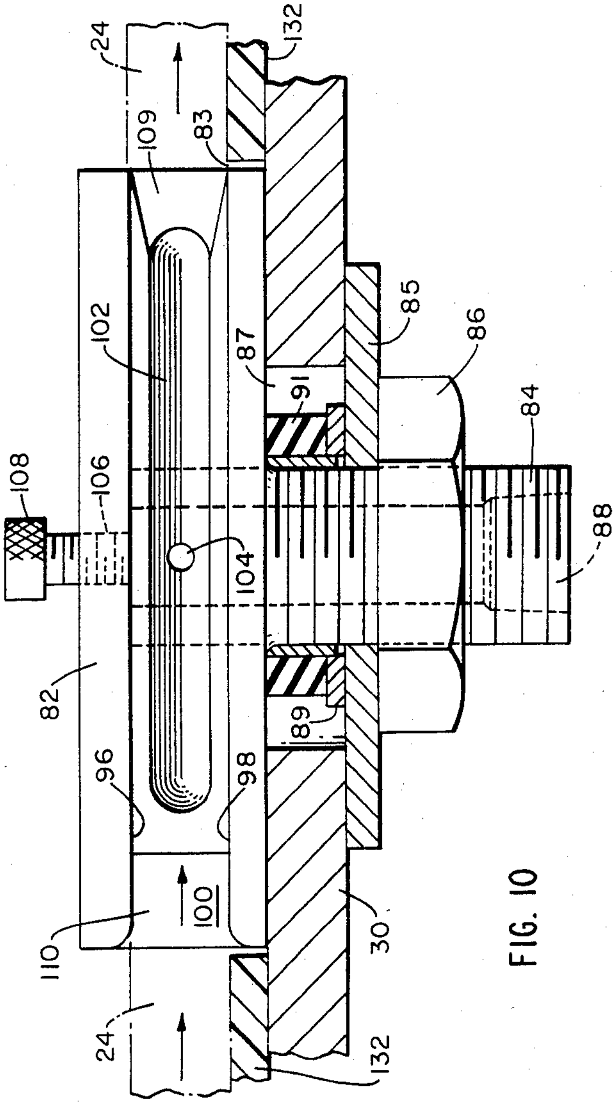
FIG. 10 is a side elevation view of the glue applicator of FIG. 9 as installed in the machine of FIG. 1.

FIG. 10 shows that the mounting stem 84 extends to below the table 30 and secures the head to the table with a washer 85 and a nut 86 threaded onto the stem. The washer 85 and a nut 86 hold the applicator head to the table 30 but allow the applicator to undergo adjustment movement along the plane of the table. For this purpose, the table is apertured with a slot 87 elongated transverse to the forward direction of the machine as FIG. 10 shows and through which the stem 84 passes to mount the applicator. Further, a collar 89 within a compliant sleeve 91 are seated on the stem within the slot, i.e. between the head 82 and the washer 85. The sleeve 91 is sufficiently long to be compressed when the applicator is mounted, FIG. 10, and the collar 89 limits the sleeve compression.

The exterior surfaces of the illustrated applicator head 82 define a pair of opposed outwardly-directed vertical faces 94, 94 and outwardly projecting horizontal surfaces 96 and 98 along the sides of each such face 94 to form a lengthwise slide channel 100 on each of two opposed sides of the applicator head. Each channel conforms generally to the height of a wood fillet 24. An elongate depression or recess 102 extends over a substantial central portion of each face 94. Internal glue-carrying passages 104 connect the glue cavity 92 to the recesses 102 of the opposite, outwardly-directed faces 94. Each face 94, 94 is flat and planar, and extends around, to bound, the entire periphery of the recess 102 therein. The top of the applicator head 82 has a threaded bleed aperture 106 communicating with the anterior cavity 92. A closure screw 108 is removably threaded into the aperture to close it. The applicator vertical faces 94 are substantially parallel, except that inwardly-beveled surface portions 110 on the upstream end guide oncoming fillets 24 into the applicator channels 100.

In addition, each face 94 has, at the trailing, downstream end, a glue-spreading recessed surface 109. The spreading surface extends from the reservoir recess 102 with decreasing depth and increasing width, as appears in FIGS. 9 and 12. This forms a blade-like surface which enhances the spreading of a uniform glue coating of controlled thickness determined by the minimal recess of the surface.

The head 82 of the glue applicator 78 (typical of the others in the machine) is thus basically an elongated block recessed on each of two opposite sides with a slide channel 100 formed by a face 94 and by the surfaces 96 and 98. Each slide channel slidingly receives the edge of a fillet advancing on the table. The base of each slide channel, formed by the face 94, is apertured along the channel length by the recess 102. This recess 102 receives glue 90, and the passage of the side edge of an advancing fillet by the pool of glue in the recess supplies a substantially continuous and uniform coating of glue to the fillet edge. The glue is readily maintained under slight pressure to coat the edges of the row of advancing wood fillets with high reliability but without leakage of glue onto other surfaces of the fillet or onto other elements of the machine 20.

Figure 6:
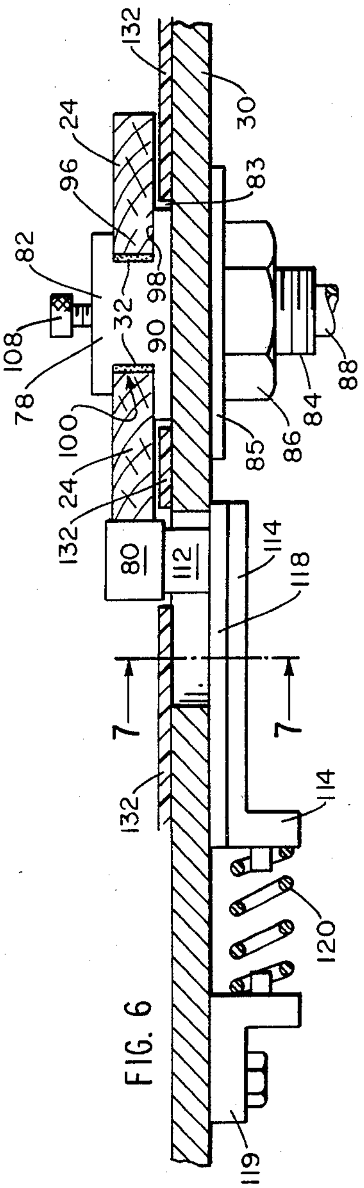
FIG. 6 is a fragmentary transverse sectional view of two fillets passing a glue applicator during operation of the machine, as viewed along line 6—6 of FIG. 1.
Figure 7:
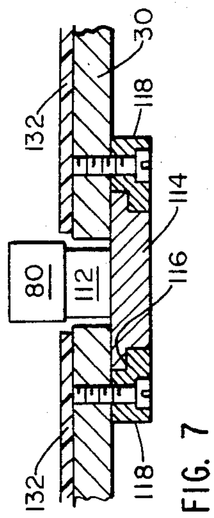
FIG. 7 is a detailed elevation view of a hold-down wheel for pressing fillets against the glue applicator, taken along line 7—7 of FIG. 6.
Figure 9:
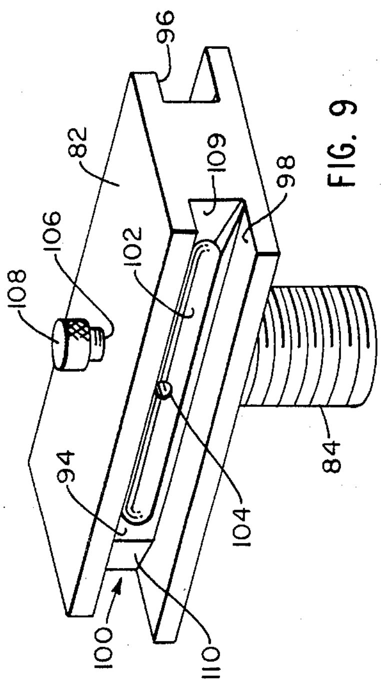
FIG. 9 is a perspective view of the glue applicator for the machine of FIG. 1.
Figure 11:
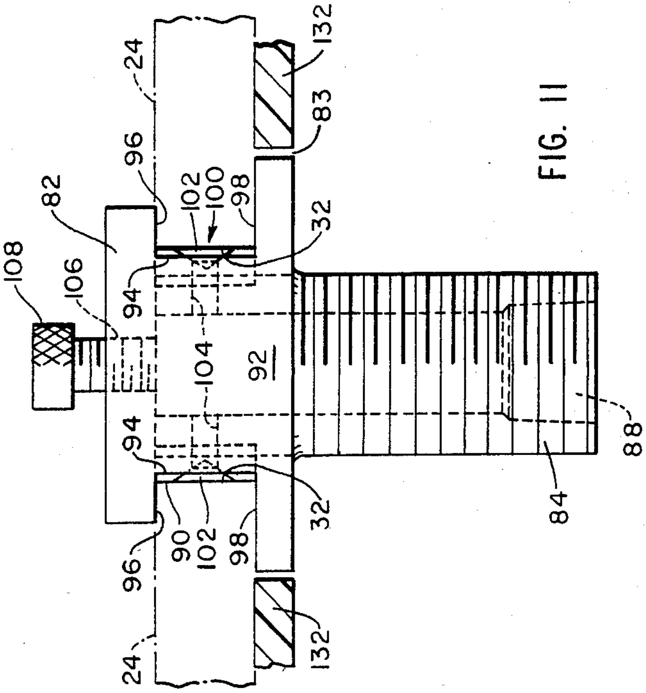
FIG. 11 is an end elevation view of the glue applicator of FIG. 9.
Figure 12:
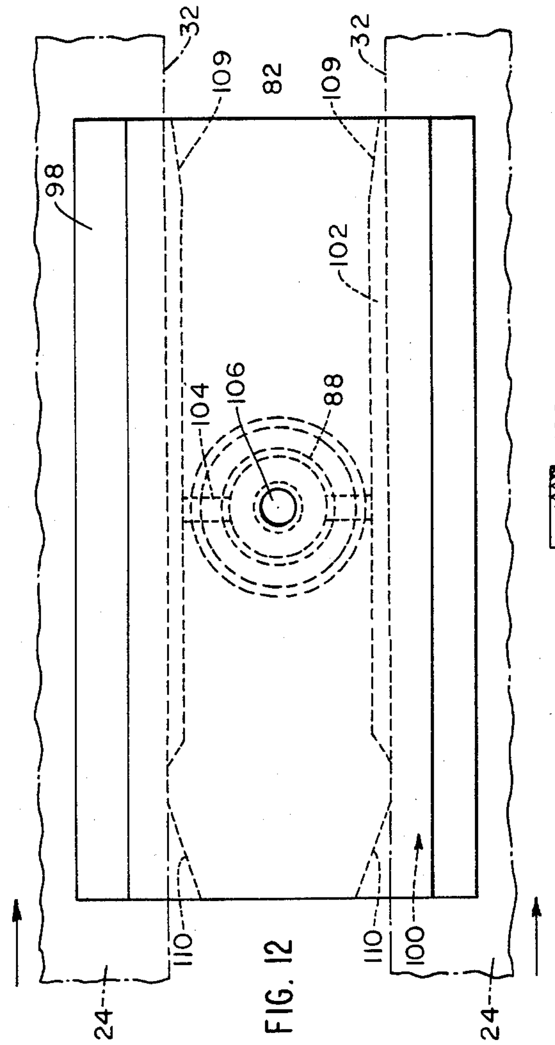
FIG. 12 is a top plan view of the glue applicator of FIG. 9.

With reference to FIG. 2 and the detailed showing in FIGS. 6 and 7, the compressing idler wheel 80 at the first gluing station 76 rotates about a vertical shaft 112 mounted to the table 30 on an idler carriage 114. The carriage 114 is slidable along the table, in a direction perpendicular to the path of the fillets 24, in a channel 116 formed between a pair of idler support rails 118, 118. A spring 120 is compressed between the idler carriage 114 and a table-mounted stop 119 to urge the idler carriage 114 and the idler wheel 80 inwardly, toward the center of the machine 20 and hence against the fillets in the path **28*b***.

As FIG. 2 shows, on the other side of the central path **28*a* from the idler wheel 80, a similarly-mounted idler wheel 81 is provided to press inwardly against the fillets in the path 28*c*. The resultant opposed forces, which the two resiliently-biased pressing wheels 80 and 81 apply to the fillets in the paths 28*b* and 28*c*, press those fillets inwardly toward the fillets in the central path 28*a*. The adjustable slot-mounting of each glue applicator 78 and 79, as described with reference to FIG. 10, allows each applicator to positionally adjust in response to the pressure from the pressing wheels 80 and 81**.

With reference to FIG. 3, the result of this construction of the glue applicators and of the pressing idlers in the machine 20, is that as the three rows of wood fillets 24 pass through the first gluing station 76, the long, narrow sides 32 of the fillets are wiped against the glue applicator faces 94, and glue 90 contained in the face recesses 102 is placed on the fillet sides 32. The inward compression by the idler wheels 80 and 81 of the fillets against the glue applicators 78, 79 minimizes gaps between the fillet sides 32 and the glue applicator faces 94; such gaps could allow leakage of glue and discontinuous gluing of the fillets.

After the fillets **24*a*, 24*b* and 24*c* leave the first gluing station 76, their opposite edge faces 32 bear glue 90. The paths 28*a*, 28*b* and 28*c* of the fillets are still separated. Now strips 34 of sheets of compressible material are inserted between the glue-bearing fillet sides 32**.

A suitable compressible material for the strips 34 is a highly compressible and expandable closed cell foam. The strips 34 may, for example, be cut from a preformed sheet of neoprene or polyethylene. A suitable neoprene is number 4,002 manufactured by Tenneco Chemicals, Inc., General Foam Division, Carlstadt, N.J., and a suitable polyethylene sheet is Volara Type E manufactured by Voltek, Inc. of Lawrence, Mass. The thickness of the strip 34 is determined by the maximum dimensional change in fillet width that is likely to occur. A strip width of between four-tenths millimeter and three millimeters is usually chosen for the above-described fillets of two and one-quarter centimeter width. The height of the strip 34 is equal to the depth of the wood fillets 24. As apparent from FIG. 14, the strip 34 thus separates adjacent rows of wood fillets when interposed between them, to form an inter-fillet cushion.

Figure 13:
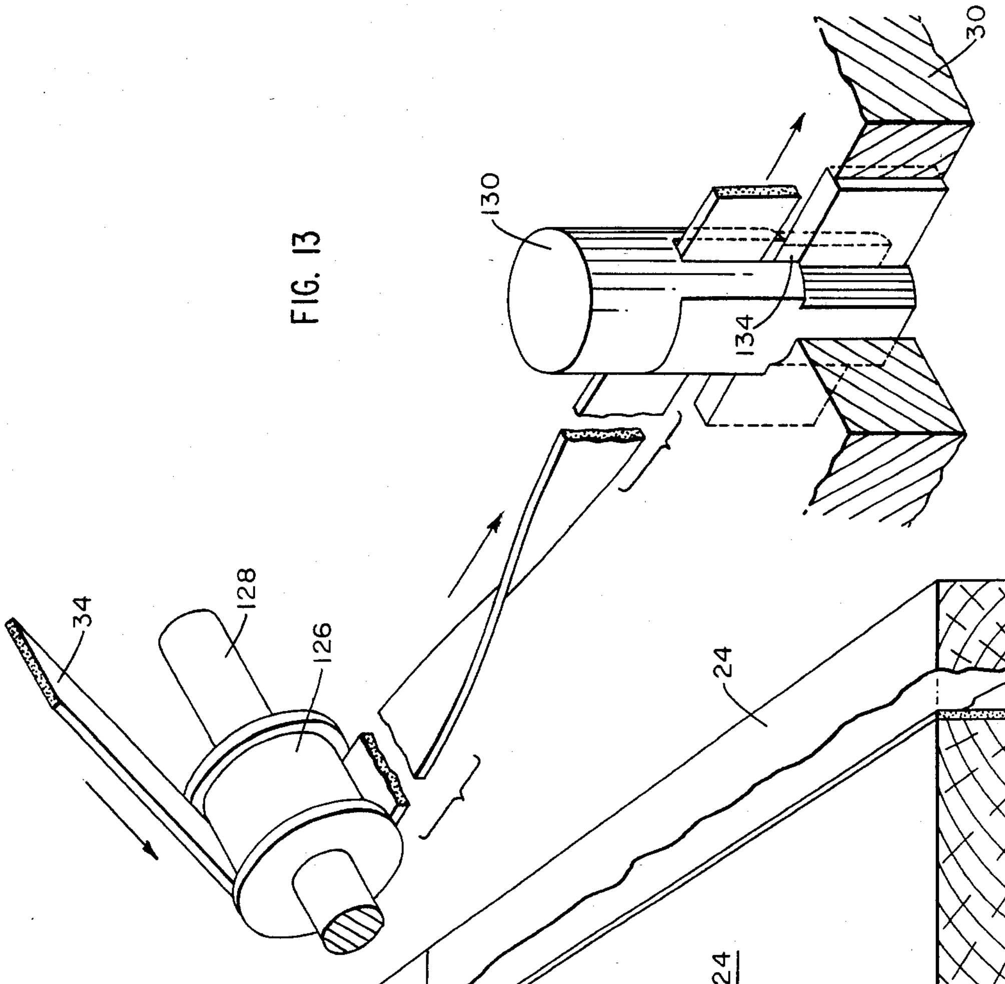
FIG. 13 is a perspective view of a pin for turning strips of compressible material from the horizontal to a vertical orientation for application between wood fillets in the machine of FIG. 1.

As shown in FIGS. 1 and 13, each strip 34 is provided to the assembly operation from a separate supply roll 122, rotatably mounted on a horizontal shaft 124. The strips 34 are inserted between fillets 24 whose sides have just had glue 90 applied to them at the first gluing station 76. The leading edge of each strip 34 may be inserted by hand between glue bearing fillet sides at the start-up of the assembly operation, but subsequently the feeding of the strip 34, which is continuous, is done automatically.

The strips 34 are carried to the machine 20 from the strip supply rolls 122 around strip guide wheels 126 mounted on horizontal shafts 128. The strips 34 are generally in a horizontal orientation at this point, and slotted alignment pins orient them vertically for insertion between the wood fillets 24. As shown in FIGS. 1, 2 and 13, the pins 130 are mounted on the table 30 and located between the paths of fillets 24 with glue-bearing sides 32. A vertically-extending pin-bifurcating slot in the pin changes the orientation of the strips 34 from horizontal to vertical. The strip 34 passes through the vertical slot 134 just before the fillets 24 converge.

After the application of glue 90 to the fillets 24 of wood in the three central paths **28*a*, 28*b* and 28*c*, at the first gluing station 76, and the insertion of compressible material strips 34 between the glue-bearing sides 32 of the fillets 24, the paths 28*a*, 28*b* and 28*c*—formerly spaced apart—converge as FIG. 2 shows. The convergence is guided by the skewed idler wheels 131*a* and 131*b*, and by the converging walls 70 which bound the outside of the fillet paths 28*b* and 28*c*, and by the continuous strips 34, which lead into downstream, already converged, fillet paths 28. Guide blocks 135 are mounted spaced above the table 30 to slidingly engage the tops of the advancing fillets and are centered over the strips 34. The blocks hold the strips down and thereby maintain them fully inserted between the fillets 24**.

Figure 4:
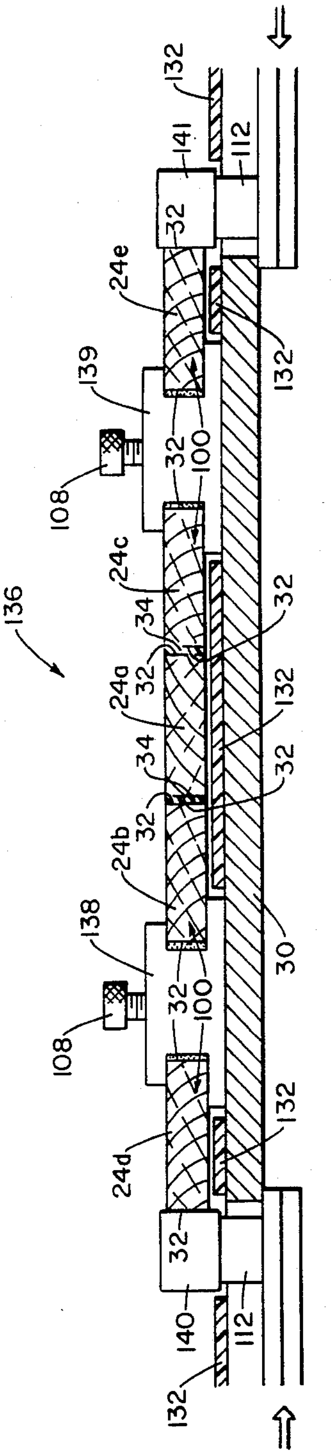
FIG. 4 is a view similar to FIG. 3 of wood fillets in the second gluing station of the machine, taken along line 4-4 of FIG. 2.

The convergence is complete at the next, second, gluing station 136 where, as FIG. 4 shows, glue 90 is applied to the sides 32 of the next adjacent oppositely facing fillets 24, by a pair of glue applicators 138, 139. Further, the compression provided by a further pair of resiliently-biased idler wheels 140, 141 eliminates gaps between the faces of the glue applicators 138 and 139 and the sides of fillets **24*b* and 24*d* and of fillets 24*c* and 24*e*, and compresses the previously-glued sides 32 of fillets 24*a*, 24*b* and 24*c*. Thus, the bonding of the fillets 24*a*, 24*b* and 24*c* in the three central fillet paths 28*a*, 28*b* and 28*c* is accomplished at the second gluing station 136, which also applies glue 90 for the subsequent bonding of fillets 24*d* and 24*e* in the next two outermost paths 28*d* and 28*e***.

Subsequent gluing and compressing stations perform similar operations, pressing together fillets in accumulating central paths, and applying glue to fillets in next successive outermost paths. The last such gluing and compressing station 142 of the illustrated machine 20 is shown in FIG. 5, and is succeeded by a compressing station 144 where the fillets 24 in the outermost paths 28*l* and 28*m* are bonded to fillets 24 in the more central paths 28*j* and 28*k*. A cushion-inserting mechanism as shown in FIG. 13 is provided to introduce a cushion strip 34 between each pair of adjacent rows of glued fillets, as previously described for the rows of fillets in paths 28*a* and 28*b*, and in paths 28*a* and 28*c*. A pair of idler wheels 143 rotatable on outwardly-skewed shafts engage the tops of the outer-path fillets between the stations 142 and 144, along with a pair of converging walls 70*c* and 70*d*.

With further reference to FIG. 5, the completely bonded width of the flooring sheet 36 next passes through a glue-setting station 145 and to the cutting station 38. The station 145 supports the fully assembled sheet 36 of fillets 24 on an apertured surface, illustrated of expanded metal. Drying air is circulated around the sheet, typically by employing a blower of heated air, and radiant heating can also be directed onto the sheet. The station 145 further can enclose these elements within a tubular enclosure or like hood. This and other structures for the glue-setting station 145 can be provided according to known techniques and is, for simplicity of the drawings, not shown further. The cutting station 38 has a housing 148 beneath the machine table 30 within which a rotary saw 150 is mounted. The saw 150 and saw motor 152 are mounted on a horizontal shaft 154 which is mounted in a support 156 pivotable in the vertical direction about a pivot 158 on one side of the housing 148. The other side of the saw support 156 is connected to the vertical piston 160 of a pneumatically-driven cylinder 162 which periodically raises the saw 150 through apertures in the table 30 and housing 148 to cut the assembled flooring sheet 36 into planks 22. The cutting is timed to occur when the intermittent movement of the wood fillets is at a stop.

It will thus be seen that the objects set forth above, among those made apparent from the preceding description, are efficiently attained. The machine and process of the invention provide wood panel sections that are attractive, durable, and suitable for use in condition of relatively large changes in temperature and in humidity. The machine and process can attain these results with relatively common and low-cost materials, i.e. wood fillets, cushion material, and adhesive. Further, practice of the invention can be highly automated to require little operator attention. Since certain changes may be made in carrying out the above process, in the constructions set forth, and in the resultant flooring product, without departing from the scope of the invention, it is intended that all matter contained in the above description or shown in the accompanying drawings be interpreted as illustrative and not in a limiting sense.

By way of non-limiting example, features of the invention can be used in the manufacture of edge-bonded and edge-laminated articles other than the flooring described above. One such other practice is the manufacture of truck flooring from wood strips. One current practice requires the manual application of glue to the edges of each wood strip, and the feeding of many such glue-carrying strips arranged side-by-side to a pressing device. The resultant article is a flooring panel with the strips, which typically have random lengths, edge-bonded or edge-laminated together. Features of this invention can automate such manufacture. That is, the above-described machine and process for advancing strips side-by-side in separate paths, for automatically gluing the edges of the innermost strips and subsequently of progressively outermore strips, for bringing together and pressing glued strips, in successive stages with additional strips, and for drying or otherwise curing the laminated assembly, can be applied—in part or entirely—to advantage in this manufacture of truck flooring. In this practice, however, the glue-carrying strips are joined directly to one another. There is no intervening element such as the cushioning strips of the illustrated embodiments.

It is also to be understood that the following claims are intended to cover all of the generic and specific features of the invention herein described, and all statements of the scope of the invention which, as a matter of language, might be said to fall therebetween.

Having described the invention, what is claimed as new and secured by Letters Patent is:

1. Apparatus for assembling panel-like flooring sections from elongated fillets of wood or similar material, said apparatus comprising means for advancing a first row of fillets longitudinaly side by side with a second row of fillets on assembly paths, first means for adhesively, joining longitudinal edges of fillets in said first row to a first side of a fillet-separating cushion of compressible and expandable material, and second means for adhesively joining longitudinal edges of fillets in said second row to the opposite, second, side of said cushion, whereby said apparatus assembles the sections with said cushion, with said compression and expansion thereof, separating and holding together fillets of said first row and fillets of said second row.

2. The apparatus of claim 1 in which said first and second joining means are adapted to join longitudinal edges of fillets in said first and second rows to opposite sides of said cushion concurrently.

3. Apparatus of claim 1 in which said first and second means include means for applying adhesive to one of said fillets in said first row and said first side of said cushion, and for applying adhesive to one of said fillets in said second row and said second side of said cushion, and means for pressing together said fillets in said first and second rows thereof with said cushion therebetween.

4. Apparatus for assembling panel-like flooring sections from elongated fillets of wood or similar material, said apparatus comprising means for advancing a first row of fillets longitudinally side by side with a second row of fillets on assembly paths, and means for bonding fillets of said first row, at longitudinal edges of said fillets, to one side of inter-fillet cushion means of compressible and expandable material and for bonding fillets of said second row to the other opposite side of said cushion material, so that said cushion material is interposed between and joins together and separates said longitudinal edges of said first and second rows of fillets.

5. Apparatus for assembling panel-like sections of flooring from fillets of wood or similar material, comprising path means defining a plurality of substantially parallel elongated paths for rows of fillets to travel along said paths, including a central path and outer paths for central and outer rows of fillets, moving means for moving said fillets along said paths, a first glue station including glue-applying means between at least said central path and a second, outer path of said fillets for applying glue to opposing faces of fillets in said central and second paths, a first pressing station located downstream of said glue station and including means for pressing fillets in said central and second paths, transversely to the elongation of said paths, whereby fillets in said central and second paths are bonded together, a second glue station downstream of said first glue station and including second glue-applying means between at least said central path of fillets and a third, outer path of fillets for applying glue to opposing faces of fillets in said central and third paths, and a second pressing station located downstream of said second glue station and including second pressing means for pressing fillets in said central, second, and third paths transversely to the elongation of said paths, thereby to join together fillets in said central, second, and third paths.

6. The apparatus of claim 5 wherein said second gluing station includes second glue-applying means for compressively applying glue to opposing faces of fillets in said first and third rows of fillets and compressing means for compressing fillets in said first and second paths, transversely to the elongation of said paths, said second glue-applying means and said compressing means being aligned in a direction transverse to the elongation of said paths.

7. Apparatus for assembling panel-like sections of flooring from fillets of wood or similar material, comprising path means defining a plurality of substantially parallel elongated paths for rows of fillets along said paths, moving means for moving said fillets along said paths, a first glue station comprising glue-applying means between at least first and second adjacent paths of said fillets for applying glue to opposing faces of fillets in said first and second paths, a first pressing station located downstream of said glue station and including means for pressing fillets in said first and second paths transversely to the elongation of said paths, a first compressible and expandable material-inserting station downstream of said first glue station and upstream of said first pressing station, said inserting station including inserting means for inserting compressible material between glue-bearing faces of fillets in said first and second paths for separating such fillet faces, said pressing means of said first pressing station being adapted to press together fillets in said first and second paths with said compressible and expandable material between them, whereby said fillets are glued to opposing faces of said material.

8. The apparatus of claim 7 wherein said path means define a central path and outer paths for central and outer rows of fillets, and further comprising a second glue station downstream of said first glue station and including second glue-applying means between at least said first path of fillets and a next adjacent outer third path of fillets for applying glue to opposing faces of fillets in said first and third paths, and a second pressing station located downstream of said second glue station and including second pressing means for pressing fillets in said first, second, and third paths, transversely to the elongation of said paths, thereby to join together fillets in said first, second, and third paths.

9. The apparatus of claim 8 further comprising a second compressible material inserting station downstream of said second glue station and upstream of said second compressing station, said second inserting station including second inserting means for inserting compressible material between glue-bearing faces of fillets in said first and third paths, said second pressing means of said second pressing station being adapted to press together fillets in said first and third paths with said compressible material between them, whereby fillets in said first and third paths are glued to opposing faces of said compressible material.

10. The apparatus of claim 9 wherein said second gluing station includes said first pressing station.

11. The apparatus of claim 5 or 7 wherein said moving means is adapted to move said fillets intermittently.

12. Apparatus for applying an adhesive-like liquid to a first surface of each of successive workpieces being advanced along a processing path which extends longitudinal to said first surfaces, said apparatus comprising means forming a channeled slide surface extending along said processing path and located for sliding engagement therealong and within the channel thereof by said first surfaces of said workpieces, means forming a depression recessing said slide surface, said depression being elongated on said surface along the direction of workpiece advance, and liquid supply means communicating with said elongated depression for supplying said liquid to said surface by way of said elongated surface-recessing depression, thereby to provide a pool-like volume of said liquid in said depression and openly exposed to said workpiece first surfaces.

13. Apparatus according to claim 12 further comprising means for resiliently urging said workpieces advancing along said path against said slide surface, thereby to enhance liquid-pickup engagement by said workpiece first surfaces with said slide surface.

14. Apparatus according to claim 12 wherein said slide surface forms the base of a slide channel adapted to slidingly receive therein said first surface and the adjoining surfaces of each said workpiece.

15. A method for assembling panel-like sections of flooring from fillets of wood or similar material, said method comprising the steps of:

advancing first and second rows of fillets longitudinally side by side on assembly paths, adhesively joining longitudinal edges of fillets in the first row to a first side of a fillet-separating cushion of compressible and expandable material, and adhesively joining longitudinal edges of fillets in the second row to a second, opposite side of said cushion, whereby said sections are assembled with said cushion, with said compression and expansion thereof, separating and holding together fillets of said first row and fillets of said second row.

16. A method for assembling panel-like sections of flooring from fillets of wood or similar material, said method comprising the steps of advancing central and outer rows of fillets longitudinally along side-by-side central and outer assembly paths, applying glue to opposing faces of the moving fillets in a central path and in a next adjacent outer path, inserting compressible and expandable fillet-separating cushion material between the glue-bearing opposite faces, and pressing said fillets in said central and next outer paths together for gluing said fillets to opposing faces of said material and with said compressible and expandable material between and separating them.

17. Apparatus for assembling panel-like sections of flooring from fillets of wood or similar material, comprising path means defining a plurality of substantially parallel elongated paths for rows of fillets to travel along said paths, moving means for moving said fillets along said paths, a first glue station comprising glue-applying means between at least first and second adjacent paths of said fillets for applying glue to opposing faces of fillets in said first and second paths, said glue-applying means comprising first and second oppositely outwardly directed slide channels each having a channel-bottoming face, and having a glue-carrying passage communicating with said faces for delivering glue to said faces, said passage being connectable to a supply of glue, each said slide channel slidably receiving therein a fillet with one fillet face in sliding abutment with said channel face, for applying glue to opposing faces of fillets in said first and second paths, a first pressing station located downstream of said glue station and including means for pressing together fillets in said first and second paths, transversely to the elongation of said paths, whereby fillets in said first and second paths are bonded together.

18. The apparatus of claim 17, further comprising a recess in each of said glue-applying channel faces, each said recess communicating with said glue-carrying passage, and wherein said glue station includes means adapted to press fillets in said first and second paths against said glue-applying channel faces.

19. Apparatus for assembling panel-like sections from elongated fillets of wood or similar material, said apparatus comprising means for advancing a first row of fillets longitudinally side-by-side with a second row of fillets on assembly paths, first means for applying adhesive to one side of said fillets in said first row and for applying adhesive to the one side of said fillets in said second row which is opposite and facing said one side of said fillets in said first row, means for introducing an inter-fillet cushion of compressible and expandable material between said opposed adhesived sides of said first and second rows of fillets, and means for pressing together said fillets in said first and second rows with said cushion therebetween, thereby to adhesively joined said fillets of said first and second rows and said cushion.

* * * * *